United States Patent
Georgiev (10) Patent No.: US 7,605,821 B1
(45) Date of Patent: Oct. 20, 2009

(54) POISSON IMAGE-EDITING TECHNIQUE THAT MATCHES TEXTURE CONTRAST

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 514 days.

(21) Appl. No.: 11/241,559

(22) Filed: Sep. 29, 2005

(51) Int. Cl.
- *G06G 5/00* (2006.01)
- *G06T 11/40* (2006.01)
- *G06K 9/40* (2006.01)
- *G06K 9/56* (2006.01)

(52) U.S. Cl. ............... 345/582; 382/260; 382/275; 382/205; 345/583; 345/584; 345/585; 345/587; 345/588; 345/552

(58) Field of Classification Search ............... None
See application file for complete search history.

(56) References Cited

U.S. PATENT DOCUMENTS

| | | | | |
|---|---|---|---|---|
| 4,577,235 A * | 3/1986 | Kannapell et al. | ........... | 358/462 |
| 5,479,537 A * | 12/1995 | Hamashima et al. | ........ | 382/266 |
| 5,850,475 A * | 12/1998 | Kasao | ........................ | 382/173 |
| 6,154,518 A * | 11/2000 | Gupta | ......................... | 378/62 |
| 6,442,301 B1 * | 8/2002 | Edgar | ......................... | 382/275 |
| 6,587,592 B2 * | 7/2003 | Georgiev et al. | ............ | 382/254 |
| 6,667,746 B1 * | 12/2003 | Hua et al. | .................... | 345/582 |
| 6,985,263 B2 * | 1/2006 | Georgiev et al. | ............ | 358/3.26 |
| 7,151,863 B1 * | 12/2006 | Bradley et al. | ............... | 382/299 |
| 7,315,647 B2 * | 1/2008 | Blake et al. | .................. | 382/173 |
| 7,418,131 B2 * | 8/2008 | Wang et al. | .................. | 382/165 |
| 2003/0012453 A1 * | 1/2003 | Kotlikov et al. | .............. | 382/275 |
| 2003/0016218 A1 * | 1/2003 | Zwicker et al. | .............. | 345/424 |
| 2003/0099406 A1 * | 5/2003 | Georgiev et al. | ............. | 382/268 |
| 2005/0243099 A1 * | 11/2005 | Dumitras et al. | ............ | 345/582 |
| 2005/0271261 A1 * | 12/2005 | Onishi et al. | ................. | 382/149 |
| 2006/0045372 A1 * | 3/2006 | Wang et al. | .................. | 382/254 |

(Continued)

OTHER PUBLICATIONS

Fischer et al. (Journal of Mathematics and Vision, 18:81-85, 2003, "Curvature Based Image Registration").*

(Continued)

*Primary Examiner*—Vikkram Bali
*Assistant Examiner*—Michelle Entezari
(74) *Attorney, Agent, or Firm*—Robert C. Kowert; Meyertons, Hood, Kivlin, Kowert & Goetzel, P.C.

(57) ABSTRACT

One embodiment of the present invention relates to a system for reconstructing an image. During operation, the system receives an original image, wherein the original image includes a defective area to be reconstructed. The system also receives a reference to a texture image, which contains a texture to be used during the reconstruction. The system then divides the values of pixels in the defective area and surrounding boundary pixels, by the values of corresponding pixels in the texture image to produce a first intermediate image. Next, the system solves a partial differential equation (PDE) for non-boundary pixels in the first intermediate image subject to values of the boundary pixels in the first intermediate image to produce a second intermediate image. The system then multiplies the values of pixels in the second intermediate image by the values of corresponding pixels in the texture image to produce a replacement image. Finally, the system substitutes the replacement image into the defective area of the original image.

21 Claims, 5 Drawing Sheets
(3 of 5 Drawing Sheet(s) Filed in Color)

U.S. PATENT DOCUMENTS

2006/0245645 A1* 11/2006 Yatziv et al. ............ 382/167
2007/0098288 A1* 5/2007 Raskar et al. ............ 382/254
2007/0183684 A1* 8/2007 Bhattacharjya ........... 382/274

OTHER PUBLICATIONS

Perez, Gangnet, and Blake, "Poisson Image Edition", Microsoft Research UK.

Fattal, R., Lischinski, D., and Werman, M. "Gradient Domain High Dynamic Range Compression", ACM Transactions on Graphics, vol. 21, Issue 3, pp. 249-256.

Burt, P., and Adelson, E. "A Multiresolution Spline wirh Application to Image Mosaics", 1983, ACM Transactions on Graphics, vol. 2, Issue 4, pp. 217-236.

Publication: "Poisson Image Editing"; by Perez et al, ACM Trans. Graph 22(3): 313-318 (Jul. 2003).

* cited by examiner

POISSON IMAGE-EDITING TECHNIQUE THAT MATCHES TEXTURE CONTRAST

BACKGROUND

1. Field of the Invention

The present invention relates to computer-based tools for manipulating digital images. More specifically, the present invention relates to an improved Poisson image-editing technique, which matches both pixel values and texture contrast while seamlessly reconstructing a region of an image.

2. Related Art

In recent years, a number of effective techniques have been developed to digitally remove scratches, wires and other objects from images and video. For example, U.S. Pat. No. 6,587,592, entitled "Generating Replacement Data Values for an Image Region," describes a system that implements a Poisson image-editing technique which "heals" a defective region of an image using data from a texture area from the same image or from a different image.

In Poisson editing, the defective pixels are replaced with new pixels described by a function $f(x, y)$, which is a solution of the Poisson equation $$\Delta f(x, y) = \Delta g(x, y) \quad (1)$$

with a Dirichlet boundary condition which constrains the new $f(x, y)$ to match the original image at the boundary. In equation (1), $g(x, y)$ is the texture that is "seamlessly-cloned" into the reconstructed area, and $$\Delta = \frac{\partial^2}{\partial x^2} + \frac{\partial^2}{\partial y^2}. \quad (2)$$

This technique effectively clones texture, while changing the color/shading of the replacement pixels to seamlessly match surrounding pixels at every boundary point.

Figure 1A:
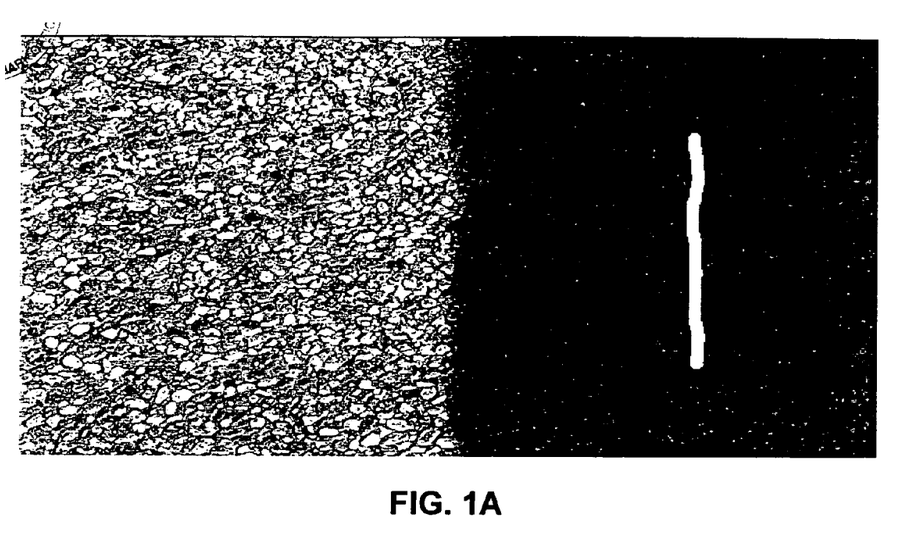
FIG. 1A illustrates an image of pebbles with a scratch.
Figure 1B:
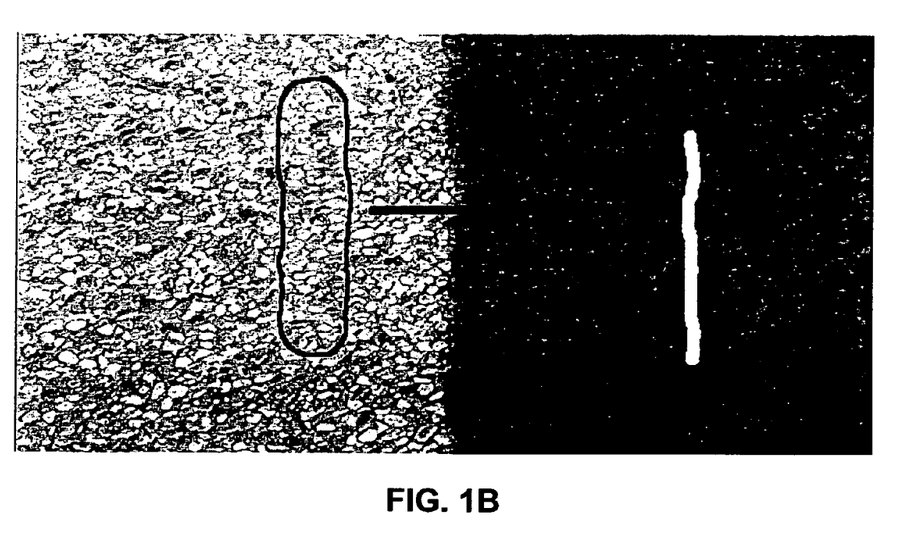
FIG. 1B illustrates the same image wherein the defective area and an associated texture region have been outlined.
Figure 1C:
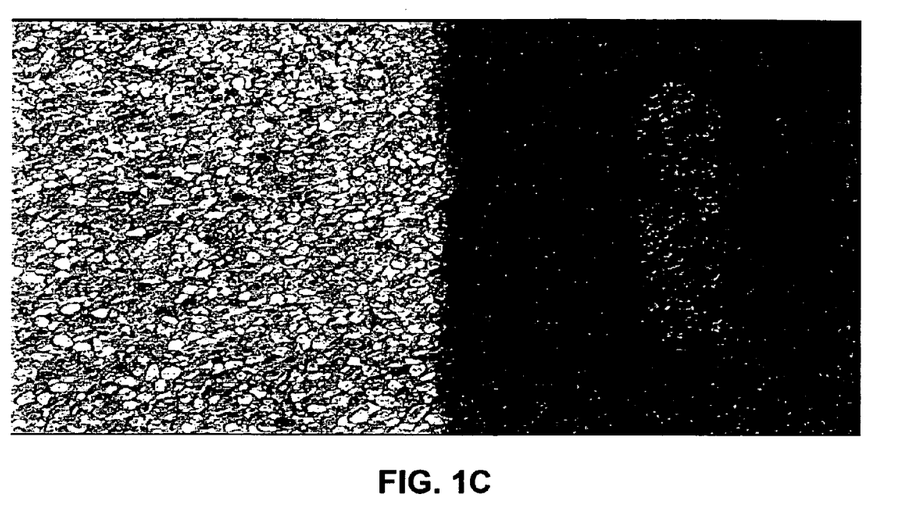
FIG. 1C illustrates how the scratch is removed by Poisson cloning from an illuminated area of the image.

While this method works very well in many cases, it sometimes encounters problems. Consider the example illustrated in FIGS. 1A, 1B and 1C. FIG. 1C illustrates how the scratch in FIG. 1A is ultimately removed by Poisson cloning of pebbles from the illuminated area into the shadow area. This technique correctly matches pixel values at the boundary of the patch, but the cloned pebbles are still easy to spot because there is too much variation and too high contrast in the reconstructed area of the image. Note that this problem is inherent in the nature of the Poisson equation (1), which transfers variations of g directly, without modification.

What is needed is a technique for digitally removing scratches, wires and other objects from images, without the above-described problems in matching variation and contrast.

SUMMARY

One embodiment of the present invention relates to a system for reconstructing an image. During operation, the system receives an original image, wherein the original image includes a defective area to be reconstructed. The system also receives a reference to a texture image, which contains a texture to be used during the reconstruction. The system then divides the values of pixels in the defective area and surrounding boundary pixels, by the values of corresponding pixels in the texture image to produce a first intermediate image. Next, the system solves a partial differential equation (PDE) for non-boundary pixels in the first intermediate image subject to values of the boundary pixels in the first intermediate image to produce a second intermediate image. The system then multiplies the values of pixels in the second intermediate image by the values of corresponding pixels in the texture image to produce a replacement image. Finally, the system substitutes the replacement image into the defective area of the original image.

In a variation on this embodiment, solving the PDE for pixels in the first intermediate image involves iteratively applying a kernel to each non-boundary pixel in the first intermediate image to generate new a pixel value.

In a variation on this embodiment, the PDE is a Laplace equation, wherein a solution to the Laplace equation is continuous and has no lines of discontinuity in the solution's derivative.

In a variation on this embodiment, the PDE is a biharmonic PDE, wherein a solution to the biharmonic PDE is continuous, has no lines of discontinuity in the solution's derivative, and at the same time minimizes curvature.

In a variation on this embodiment, the original image is a color image, and the method is applied separately to each axis of a corresponding color space.

In a variation on this embodiment, the texture image is taken from: an area within the original image; or an area within another image, which is not the original image.

In a variation on this embodiment, the system subtracts the log of pixels in the texture image from the log of corresponding pixels in the defective area (including surrounding boundary pixels) to produce the first intermediate image. Moreover, after solving the PDE to produce the second intermediate image, the system adds the log of pixels in the texture image to corresponding pixels in the second intermediate image and exponentiates the resulting pixels to produce the replacement image.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Image Reconstruction

One embodiment of the present invention solves the problem of reconstruction based on a model of the internal mechanism of the human visual system.

There is a well-known (approximate) invariance of the internal image we see with respect to change of lighting conditions. This invariance, or "color constancy," is due to the adaptation of the visual system.

We observe that it is possible to cast the adaptation problem into the mathematical framework of the vector-covector formalism. In our approach luminance is a vector, retina sensitivity is a covector, and the formalism automatically handles relighting invariance.

At each pixel (x, y) the image is a vector $f(x, y)$. For example, $f$ could be a vector describing the three color channels, $f=(R,G,B)$. Relighting transforms this vector $f$ multiplicatively. We say that $f$ changes covariantly with illumination.

In the case of grayscale images, $f$ is a 1-D vector. Note that a 1-D vector is different from a scalar. A scalar is an invariant quantity, while a vector changes covariantly with lighting. Unlike scalars, a 1-D vector does not have a numerical value until a basis, or a scale, is chosen. In our case this basis, or measure of scale at each point, is the retina sensitivity. The same vector can be seen as different lightness (perceived brightness) depending on adaptation to bright or dark environment.

Due to adaptation, at each pixel the retina sensitivity $\phi(x, y)$ transforms in opposition to, or contravariantly with, illumination. Adapted sensitivity is a covector in the sense that a contraction, or "dot product," with the vector $f(x, y)$ must produce the invariant lightness that we see in the visual system. It is as a scalar invariant $\phi \cdot f$.

The true luminance vector, $f(x, y)$ may be captured by the camera or other physical device with known sensitivity. But luminance is not observable by the human visual system. What we actually see is the scalar (i.e. invariant) quantity $\phi \cdot f$, which is the luminance vector acting on the sensitivity covector. Sometimes we will denote this as $<\phi f>$ in order to make the contraction of vector and covector explicit.

To avoid confusion, we note that in the case of grayscale images the only vector and covector properties that we are going to use are that $f$ transforms covariantly with lighting (i.e. as a vector), and $\phi$ transforms contravariantly with lighting (as a covector), due to adaptation. Lightness is a scalar $<\phi f>$, and as such it does not change with relighting. We observe only lightness; luminance and sensitivity are not observable independently.

Main Equations

The simplest way to reconstruct or inpaint the area of a scratch in an image is to replace defective pixels with a solution of the Laplace equation $$\Delta f = 0 \qquad (3)$$

with Dirichlet boundary conditions. This is equivalent to minimizing the energy expression $$\int \left(\frac{\partial f}{\partial x}\right)^2 + \left(\frac{\partial f}{\partial y}\right)^2 dx dy \qquad (4)$$

in the selected area of the scratch, where we calculate pixel values representing smallest sum of the gradients squared. In other words, we are requiring that sum of the lengths squared of the gradients be minimal.

The important observation here is that this energy is not invariant under relighting. As such, it is not appropriate as a model of the invariant (after adaptation) image that humans see.

Consider a related invariant expression, written in terms of lightness, which is a scalar (invariant) relative to relighting $$\int \left(\frac{\partial}{\partial x} <\varphi f>\right)^2 + \left(\frac{\partial}{\partial y} <\varphi f>\right)^2 dx dy. \qquad (5)$$

Minimizing this energy means sum of the lengths squared of the perceived gradients is minimal. Writing the Euler-Lagrange equation (varying $f$) we get:

$$\Delta f + \frac{2}{\varphi} grad f \cdot grad \varphi + \frac{f}{\varphi} \Delta \varphi \qquad (6)$$

where $f$ is pixel value (luminance) and $\phi$ is retina sensitivity. This can be written in a simpler form:

$$\Delta(\phi f) = 0. \qquad (7)$$

To find one possible $\phi$, assume adaptation to a "neutral" area of pure texture g(x, y) in the image. Adaptation means $\phi \cdot g = $const. Since in equations (6) and (7) $\phi$ is defined up to a multiplicative constant, we can safely assume it to be 1, and then $\phi = 1/g$.

Substituting in (7), we get our main equation $$\Delta \frac{f}{g} = 0. \qquad (8)$$

For theoretical reasons it is good to know that this equation is equivalent to $$\Delta f - 2 grad f \cdot \frac{grad g}{g} - f \frac{\Delta g}{g} + 2f \frac{(grad g) \cdot (grad g)}{g^2} = 0. \qquad (9)$$

In other words, we have found the correct right hand side for the relighting-covariant version of Poisson equation (1)

$$2 \text{grad} f \cdot \frac{\text{grad} g}{g} + f \frac{\Delta g}{g} - 2f \frac{(\text{grad} g) \cdot (\text{grad} g)}{g^2}, \tag{10}$$

that replaces $\Delta g$.

Also, note that equation (9) can be written as $$\left(\frac{\partial}{\partial x} + A_x\right)\left(\frac{\partial}{\partial x} + A_x\right)f + \left(\frac{\partial}{\partial y} + A_y\right)\left(\frac{\partial}{\partial y} + A_y\right)f = 0, \tag{11}$$

with a "guidance field," similar to what is described in Perez P., Gangnet M., Blake A.: Poisson image editing. ACM Transactions on Computer Graphics 22, 3 (July 2003), 313-318.

$$A(x, y) = -\frac{\text{grad} g}{g}. \tag{12}$$

In mathematics this is called the connection form and it defines a modified, covariant derivative, which replaces conventional derivatives as in (11). These generally describe perceived gradients as opposed to true gradients in images.

Implementation

The above-described technique can be implemented similarly to the system described in U.S. Pat. No. 6,587,592, entitled "Generating Replacement Data Values for an Image Region," by inventors Todor G. Georgiev, Mark Hamburg and Jen-Chan Chien. This patent is hereby incorporated by reference to provide details of the implementation of such as system. Note that the present invention improves upon the system described in U.S. Pat. No. 6,587,592 because the present invention matches texture contrast as well as pixel values while seamlessly reconstructing a region of an image.

Figure 2:
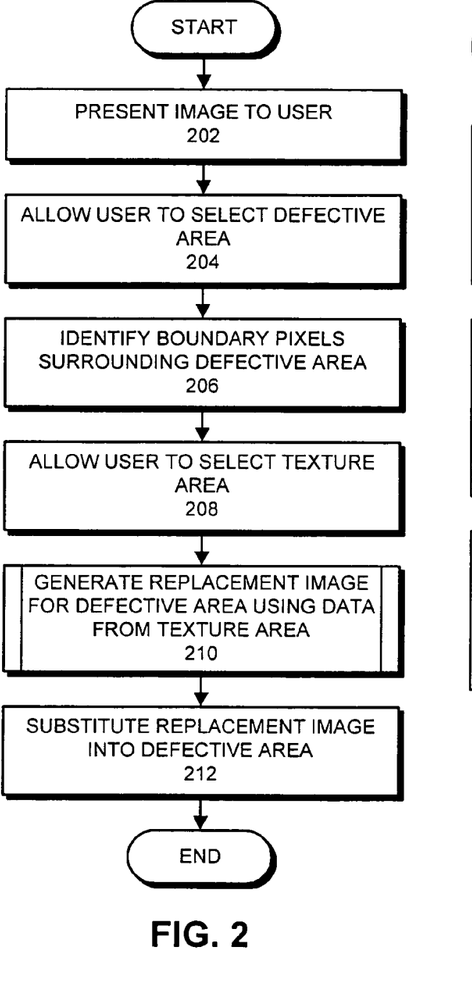
FIG. 2 presents a flow chart illustrating the image reconstruction process in accordance with an embodiment of the present invention.

Referring to FIG. 2, at a high level, the system presents an image to a user (step 202). Next, the system allows the user to select a defective area within the image (step 204). The system then identifies boundary pixels surrounding the defective area (step 206). The system also allows the user to identify a texture area within the image (or possibly within another image.) (step 208). The system then generates a replacement image for the defective area using data from the texture area (step 210). (This process is described in more detail below with reference to FIG. 3.) Next, the system substitutes the replacement image into the defective area to complete the reconstruction process (step 212).

Figure 3:
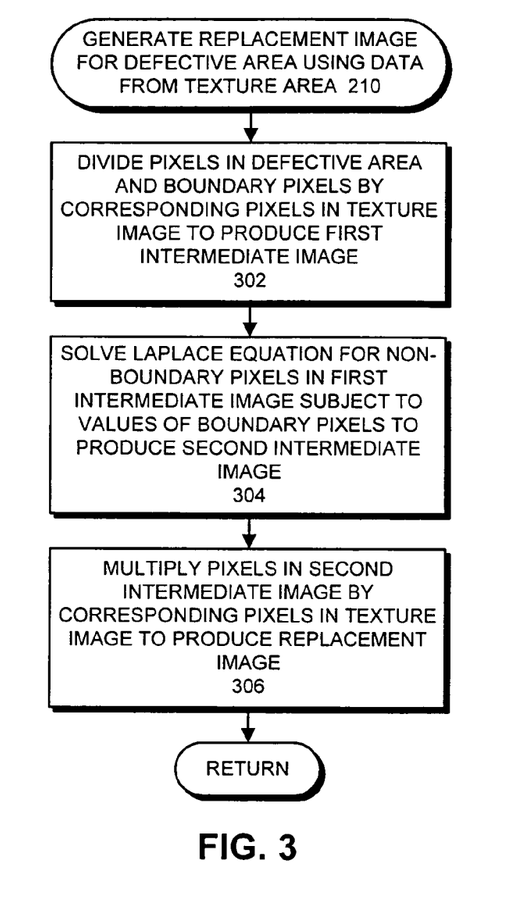
FIG. 3 presents a flow chart illustrating how a replacement image is generated through division and subsequent multiplication operations in accordance with an embodiment of the present invention.

In one embodiment of the present invention, the replacement image is generated as follows. First, the system divides pixels in the defective area and boundary pixels by corresponding pixels in the texture image, in which pixel value zero is replaced with a small number. This produces the first intermediate image $I_1(x, y)$ (step 302).

$$I_1(x, y) = \frac{f(x, y)}{g(x, y)} \tag{13}$$

Next, the system solves the Laplace equation for the second intermediate image $$\Delta I_2(x, y) = 0, \tag{14}$$

with Dirichlet boundary conditions defined by $I_1(x, y)$ at the boundary of the reconstruction area. This produces the second intermediate image $I_2(x, y)$ (step 304).

The system then multiples the result by the texture image $g(x, y)$ to produce a replacement image (step 306)

$$h(x, y) = I_2(x, y)g(x, y). \tag{15}$$

Finally, the system substitutes the defective area $f(x, y)$ in the original image with the replacement image $h(x, y)$.

Alternative Embodiment that Uses Logs and Exponentiation

Figure 4:
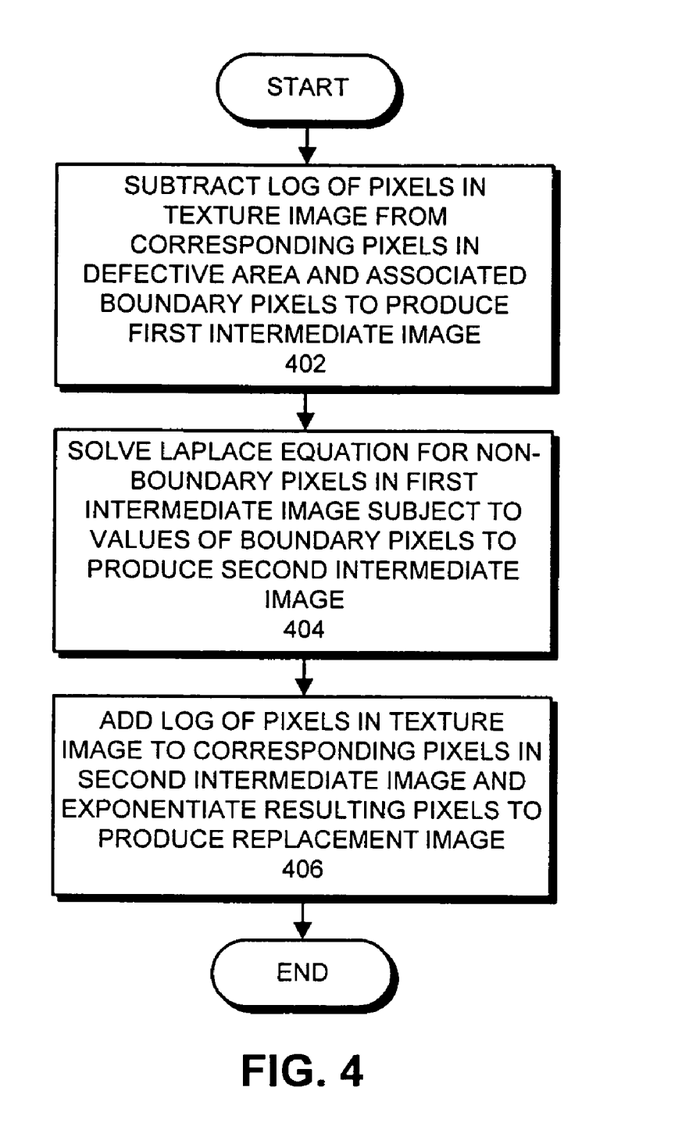
FIG. 4 presents a flow chart illustrating how a replacement image is generated by performing log operations and subsequent exponentiation operations in accordance with an embodiment of the present invention.

Referring to FIG. 4, in an alternative embodiment of the present invention, the replacement image is generated using as follows. Instead of dividing, the system subtracts the log of pixels in the texture image from the log of corresponding pixels in the defective area and associated boundary pixels to produce the first intermediate image $$I_1(x, y) = \log(f(x, y)) - \log(g(x, y)) \text{ (step 402)}. \tag{16}$$

Next, the system solves the Laplace equation for the second intermediate image $\Delta I_2(x, y) = 0$, with Dirichlet boundary conditions defined by $I_1(x, y)$ at the boundary of the reconstruction area. This produces the second intermediate image $I_2(x, y)$ (step 404).

The system then adds the log of the pixels in the texture image to corresponding pixels in the second intermediate image and exponentiates the resulting pixels to produce the replacement image (step 406)

$$h(x, y) = \exp(I_2(x, y) + \log(g(x, y))) \tag{17}$$

The system then substitutes the defective area $f(x, y)$ in the original image with the replacement image $h(x, y)$.

Results

Traditional Poisson cloning between areas of different illumination can be a problem. To provide a clean example, we have tried to remove the scratch from the shadow area in FIG. 1A using only source material from the illuminated area.

In FIG. 1C, we see the result of Poisson cloning from the illuminated area into the shadow area. It correctly matches pixel values at the boundary of the patch, but the cloned pebbles are still easy to spot. However, there is too much contrast in the reconstructed area of the image.

Figure 1D:
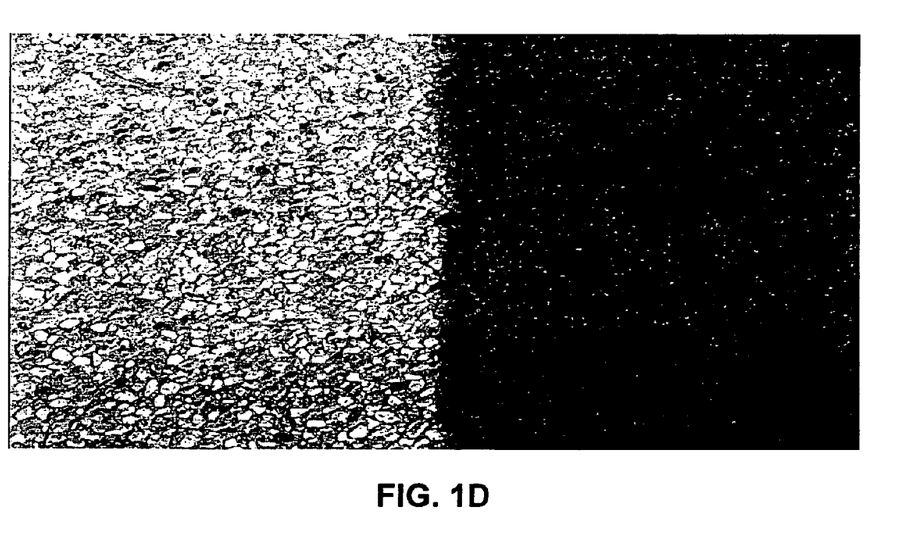
FIG. 1D illustrates how the scratch is removed by covariant reconstruction from the same illuminated area in accordance with an embodiment of the present invention.

FIG. 1D shows the result of our proposed illumination invariant method, equation (8). We see that not only the lighting is correct, but the method was able to clone texture in a really seamless way. Our experiments show that in a wide range of images equation (8) performs much better than the Poisson equation in terms of producing seamless cloning.

Figure 5:
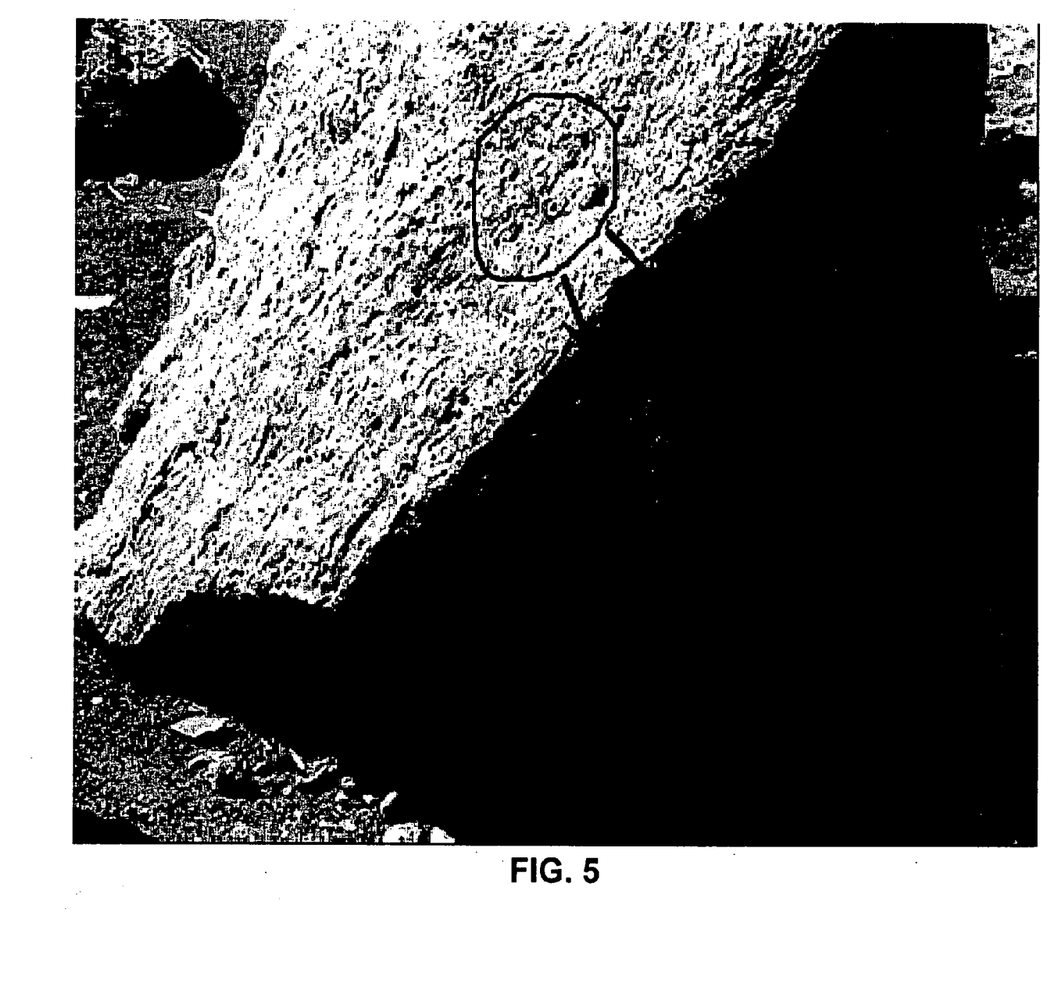
FIG. 5 presents another comparison between covariant cloning and Poisson cloning in accordance with an embodiment of the present invention.

FIG. 5 presents another comparison between covariant cloning and Poisson cloning. The cloned area on the left is the result of standard Poisson cloning from the selected area, while the cloned are on the right is the result of covariant cloning from the same area.

Conclusion and Future Work

We have been able to find energy expression for reconstruction, covariant with illumination. Our results are much better than Poisson cloning. The proposed invariant energy approach potentially applies to any image processing technique that can be defined in terms of energy and corresponding differential equations. We modify the energy to produce invariant energy and covariant equations. Results are better because now perception and adaptation are taken into account. In this way we have embedded adaptation of the visual system into the mathematical formalism of the problem.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reconstructing an image, comprising: using a computer to perform
   receiving an original image f defined on a coordinate space;
   receiving input selecting a region of the original image f within the coordinate space;
   receiving a reference to a texture image g;
   generating a first intermediate image $I_1$ by dividing f by g, wherein the division is performed over the region and its boundary such that $I_1=f/g$;
   solving the Laplace equation $\Delta I_2=0$ or the biharmonic equation $\nabla^4 I_2=0$ to determine a solution $I_2$ on the region, subject to the constraint that the solution $I_2$ agrees with the first intermediate image $I_1$ on the boundary of the region, wherein the solution $I_2$ defines a second intermediate image;
   multiplying $I_2$ by g to produce an image h, wherein the multiplication is performed over the region such that $h=I_2 g$; and
   determining new pixel values for the original image f using values of h on the region.

2. The method of claim 1, wherein said solving involves iteratively applying a kernel on said region, wherein a first application of the kernel operates on the first intermediate image.

3. The method of claim 1, wherein the original image f is a color image, and wherein the method is applied separately to each color component of the color image.

4. The method of claim 1, wherein the texture image is taken from:
   the original image f; or
   another image which is not the original image.

5. A computer-readable storage device storing instructions that when executed by a computer cause the computer to perform a method for reconstructing an image, the method comprising:
   receiving an original image f defined on a coordinate space;
   receiving input selecting a region of the original image f within the coordinate space;
   receiving a reference to a texture image g;
   generating a first intermediate image $I_1$ by dividing f by g, wherein the division is performed over the region and its boundary such that $I_1=f/g$;
   solving the Laplace equation $\Delta I_2=0$ or the biharmonic equation $\nabla^4 I_2=0$ to determine a solution $I_2$ on the region, subject to the constraint that the solution $I_2$ agrees with the first intermediate image $I_1$ on the boundary of the region, wherein the solution $I_2$ defines a second intermediate image;
   multiplying $I_2$ by g to produce an image h, wherein the multiplication is performed over the region such that $h=I_2 g$; and
   determining new pixel values for the original image f using values of h on the region.

6. The computer-readable storage device of claim 5, wherein said solving involves iteratively applying a kernel on said region, wherein a first application of the kernel operates on the first intermediate image.

7. The computer-readable storage device of claim 5, wherein the original image f is a color image, and wherein the method is applied separately to each color component of the color image.

8. The computer-readable storage device of claim 5, wherein the texture image is taken from:
   the original image; or
   another image which is not the original image.

9. A computer system for reconstructing an image, the computer system comprising:
   a storage device storing program instructions, wherein the program instructions are executable by the computer system to:
   receive an original image f defined on a coordinate space;
   receive input selecting a region of the original image f within the coordinate space;
   receive a reference to a texture image g;
   generate a first intermediate image $I_1$ by dividing f by g, wherein the division is performed over the region and its boundary such that $I_1=f/g$;
   solve the Laplace equation $\Delta I_2=0$ or the biharmonic equation $\nabla^4 I_2=0$ to determine a solution $I_2$ on the region, subject to the constraint that the solution $I_2$ agrees with the first intermediate image $I_1$ on the boundary of the region, wherein the solution $I_2$ defines a second intermediate image;
   multiply $I_2$ by g to produce an image h, wherein the multiplication is performed over the region such that $h=I_2 g$; and to determine new pixel values for the original image f using values of h on the region.

10. The computer system of claim 9, wherein to solve the equation, the reconstruction mechanism is configured to iteratively apply a kernel on said region, wherein a first application of the kernel operates on the first intermediate image.

11. The computer system of claim 9, wherein the original image f is a color image, and wherein the reconstruction mechanism is configured to operate separately on each axis of a corresponding color space.

12. The computer system of claim 9, wherein the texture image is taken from:
   the original image; or
   another image which is not the original image.

13. A method for reconstructing an image, comprising: using a computer to perform
   receiving an original image, f defined on a coordinate space;
   receiving input selecting a region of the original image f within the coordinate space;
   receiving a reference to a texture image g;
   generating a first intermediate image $I_1$ by subtracting a logarithm of g from a logarithm of f, wherein the subtraction is performed over the region and its boundary such that $I_1=\log(f)-\log(g)$;
   solving the Laplace equation $\Delta I_2=0$ or the biharmonic equation $\nabla^4 I_2=0$ to determine a solution $I_2$ on the region, subject to the constraint that the solution $I_2$ agrees with the first intermediate image $I_1$ on the boundary of the region, wherein the solution $I_2$ defines a second intermediate image;
   adding the logarithm of g to $I_2$;
   exponentiating results of said adding to produce an image h; and
   determining new pixel values for the original image f using values of h on the region.

14. The method of claim 13, wherein said solving involves iteratively applying a kernel on said region, wherein a first application of the kernel operates on the first intermediate image.

15. The method of claim 1, wherein said dividing comprises replacing a zero-value of g with a specified non-zero value.

16. The method of claim 1, further comprising receiving user input specifying the boundary of the region.

17. The method of claim 1, wherein the region identifies a defective area of the original image.

18. The device of claim 5, wherein said dividing comprises replacing a zero-value of g with a specified non-zero value.

19. The device of claim 5, further comprising receiving user input specifying the boundary of the region.

20. The device of claim 5, wherein the region identifies a defective area of the original image.

21. The method of claim 13, wherein said subtracting comprises replacing a zero-value of g with a specified non-zero value.

* * * * *

UNITED STATES PATENT AND TRADEMARK OFFICE
CERTIFICATE OF CORRECTION

| | | |
|---|---|---|
| PATENT NO. | : 7,605,821 B1 | Page 1 of 1 |
| APPLICATION NO. | : 11/241559 | |
| DATED | : October 20, 2009 | |
| INVENTOR(S) | : Todor G. Georgiev | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this

Fifth Day of October, 2010

David J. Kappos
*Director of the United States Patent and Trademark Office*